United States Patent [19]

Ayyagari et al.

[11] Patent Number: 6,021,505
[45] Date of Patent: Feb. 1, 2000

[54] METHOD AND APPARATUS FOR UPDATING A TIMER FROM MULTIPLE TIMING DOMAINS

[75] Inventors: Bhuvaneshwari Ayyagari, San Jose; Rajesh Raman, Fair Oaks, both of Calif.

[73] Assignee: Intel Corporation, Santa Clara, Calif.

[21] Appl. No.: 09/105,479

[22] Filed: Jun. 26, 1998

[51] Int. Cl.[7] .................................................... G06F 1/14
[52] U.S. Cl. ............................................................ 713/502
[58] Field of Search ................................................ 713/502

[56] References Cited

U.S. PATENT DOCUMENTS

| | | | |
|---|---|---|---|
| 5,023,771 | 6/1991 | Kishi | 710/260 |
| 5,138,707 | 8/1992 | Haller et al. | 713/500 |
| 5,210,748 | 5/1993 | Onishi et al. | 370/405 |
| 5,491,815 | 2/1996 | Basso et al. | 713/502 |
| 5,671,357 | 9/1997 | Humblet et al. | 709/242 |

*Primary Examiner*—Thomas M. Heckler
*Attorney, Agent, or Firm*—Blakely, Sokoloff, Taylor & Zafman LLP

[57] ABSTRACT

The present invention is a method and apparatus for updating a timer from a plurality of timing domains. An arbitration circuit arbitrates the update requests from the plurality of timing domains. The plurality of timing domains include at least a counter. The update requests provide the update values. A multiplexer, which is coupled to receive the update values, selects a timer value from the update values. A timer register which is coupled to the multiplexer stores the timer value synchronously with a local clock signal.

29 Claims, 5 Drawing Sheets

METHOD AND APPARATUS FOR UPDATING A TIMER FROM MULTIPLE TIMING DOMAINS

BACKGROUND OF THE INVENTION

1. Field of the Invention

This invention relates to computer systems. In particular, the invention relates to updating a timer from multiple timing domains.

2. Description of Related Art

Timing circuits are important in many communication systems. In particular, communication networks usually require accurate timing references for data transmission. High speed serial data transmissions are becoming popular due to communication efficiency, ease of interfacing, and availability of well defined protocols and standards.

The Institute of Electrical and Electronics Engineers (IEEE) 1394 is a video-speed serial interconnect that makes the convergence of consumer electronics and personal computers (PCs) possible. Products supporting 1394 protocols at 100 to 400 Megabits/sec (Mbps) are now commercially available. Products with speeds up to 3200 Mbps will be available in a near future.

To promote product development and enhance industry cooperation, the Open Host Controller Interface (OHCI) specification defines basic protocols and operational modes to support the IEEE 1394 standard and its enhancements (e.g., 1394a). There are basically two main types of data transfers in the 1394 protocol: asynchronous and isochronous. An asynchronous is a type of data transfer that guarantees delivery of data, but not necessarily the delivery time. On the other hand, the isochronous transfer is a type of data transfer that guarantees timing because late data would be useless. Examples of isochronous transfer include video and voice data where real-time data transfer is important.

An isochronous transfer requires accurate timing information to guarantee delivery time. An OHCI-compliant device should also be able to provide timing data from a number of sources. However, due to mismatch in clock frequency, delays, and types of transfer, maintaining a timer device that can operate from multiple timing domains is a difficult problem.

One solution to this problem is to use shadow register(s). A shadow register is essentially a copy of the timer register that aliases into the timer address. A timer update can be performed on the shadow register. The content of the shadow register will be transferred to the timer register when necessary. However, the use of shadow registers has many disadvantages. One disadvantage is the additional storage required for implementing the shadow registers, especially when there are many timing domains. Another disadvantage is that timing synchronization is still to be performed by external circuitry. In addition, arbitration of multiple timing updates is difficult.

Therefore, there is a need in the technology to provide an efficient technique to update a timer from multiple timing domains.

SUMMARY OF THE INVENTION

The present invention is a method and apparatus for updating a timer from a plurality of timing domains. An arbitration circuit arbitrates the update requests from the plurality of timing domains. The plurality of timing domains include at least a counter. The update requests provide the update values. A multiplexer, which is coupled to receive the update values, selects a timer value from the update values. A timer register which is coupled to the multiplexer stores the timer value synchronously with a local clock signal.

BRIEF DESCRIPTION OF THE DRAWINGS

The features and advantages of the present invention will become apparent from the following detailed description of the present invention in which.

DESCRIPTION OF THE PRESENT INVENTION

The present invention is a method and apparatus for updating a timer from multiple timing domains. The timer consists of a timer register, a decoder and arbitration circuit, a counter, a multiplexer, and a timing and control circuit. The arbitration circuit arbitrates update requests from the multiple timing domains. The update value is clocked into the timer register by a local clock. The counter is loaded with properly selected update values under the control of the timing and control circuit. The invention provides a flexible and efficient technique to update a timer in a multi-clock environment with minimal hardware.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

SYSTEM ENVIRONMENT

Figure 1:
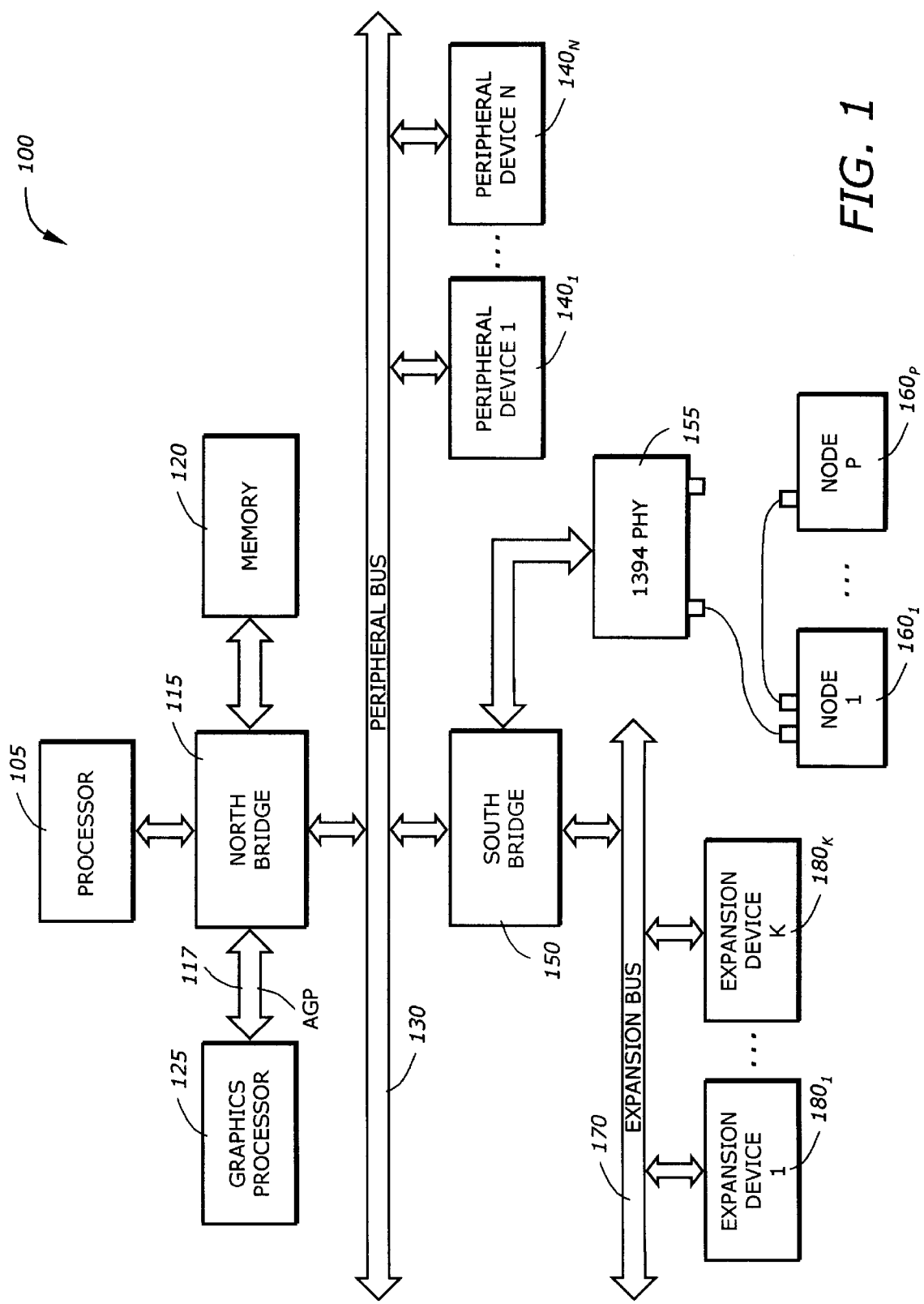
FIG. 1 is a diagram illustrating one embodiment of a system in accordance with the teachings of the invention.

FIG. 1 is a diagram illustrating one embodiment of a system 100 in accordance with the teachings of the invention. The system 100 includes a processor 105, a north bridge 115, a host bus 110, a memory 120, a graphics processor 125, an advanced graphics port interface 117, a peripheral bus 130, a south bridge 150, N peripheral devices $140_1$ to $140_N$, a 1394 physical interface 155, a serial bus 165, P nodes $160_1$ to $160_P$, an expansion bridge 170, and K expansion devices $180_1$ to $180_K$. It is to be appreciated by one skilled in the art that the specific architecture of the system 100 is not critical in practicing the present invention, as variations may be made to the system 100 without departing from the spirit and scope of the present invention.

The processor 105 may be any type of microprocessor such as a general purpose microprocessor or a microcontroller. The processor is coupled to the north bridge 115 via the host bus 110. The north bridge 115 provides an interface to other devices and to the peripheral bus 130. In one embodiment, the north bridge is a host-to-peripheral component interconnect (PCI) bridge, providing the interface between the host processor 105 and the PCI bus 130. The peripheral bus 130 provides interfaces to peripheral devices $140_1$ to $140_N$ where N is a positive integer. Examples of the peripheral devices $140_1$ to $140_N$ include disk controller, communication card, etc. The graphics processor 125 is any graphic controller that process and manipulate graphical data for displaying. The graphic processor 125 is coupled to the north bridge 115 by the advanced graphics port (AGP) bus 117. The memory 120 is the system memory that stores programs and data to be used by the processor 105 and other processors/devices that have memory access capability. The memory 120 may contain any type of memory, including read only memory (ROM), random access memory (RAM), dynamic RAM (DRAM), static RAM (SRAM), flash memory, etc.

The south bridge 150 includes circuits for interfacing to the peripheral bus 130, the expansion bus 170, and the serial bus 165 through the physical link interface 155. In addition, the south bridge 150 includes buffer memory, control logic, and other input/output functions to be described later. The south bridge 150 provides an interface to the peripheral bus 130 and the expansion bus 170. In the embodiment shown, the expansion bus 170 is the Industry Standard Architecture ("ISA") bus, although any other type of bus architecture may be used. The expansion bus 170 provides a communication path between the peripheral bus 130 and a plurality of expansion devices $180_1$ to $180_K$, where K is a positive integer, (e.g., a disk drive controller, a sound card, a modem, a serial and parallel port controller).

The south bridge 150 bridges transactions from the peripheral bus 130 and the serial bus 165. In one embodiment, the serial bus is a 1394 serial bus in accordance with the "IEEE 1394-1995 High Performance Serial Bus" published in 1995, although any other serial bus architecture may be used. The south bridge 150 is coupled to the 1394 physical interface 155. The physical link interface 155 provides the physical-level interfaces to the nodes $160_1$ to $160_P$, where P is a positive integer. The nodes $160_1$ to $160_P$ are the serial (e.g., 1394) nodes which correspond to devices that are coupled to the serial bus such as video disk systems, printer, etc.

Figure 2:
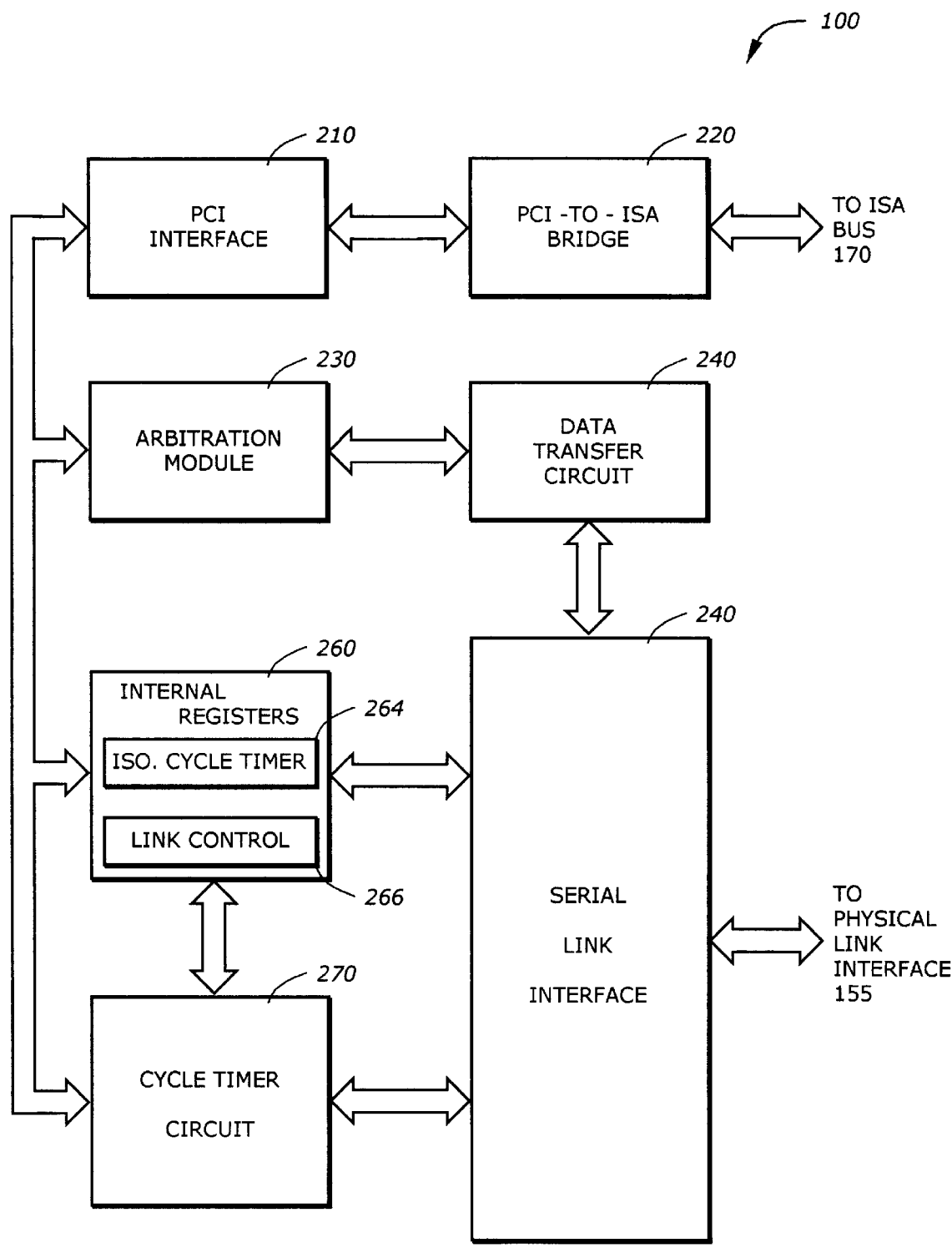
FIG. 2 is a diagram illustrating a south bridge according to one embodiment of the invention.

FIG. 2 is a diagram illustrating a south bridge 150 according to one embodiment of the invention. The south bridge 150 includes a peripheral (e.g., PCI) bus interface 210, a peripheral-to-expansion (e.g., PCI-to-ISA) bridge 220, an arbitration module 230, a data transfer circuit 240, a set of internal registers 260, a cycle timer circuit 270, and a serial link interface circuit 290. The south bridge 150 can be controlled by the processor 105 via the north bridge 115. The south bridge 150 essentially performs the control and management of data transfers, storage, buffering, and communication between the host processor 105 and other devices and the nodes $160_1$ to $160_P$. In particular, the south bridge 150 maintains a timer register to be used by the host processor 105, other devices, and the nodes $160_1$ to $160_P$.

The peripheral bus interface 210 provides interface circuits to communicate with the peripheral bus 130. In one embodiment, the peripheral bus interface 210 is a PCI interface which provides interface circuits to the PCI bus. The peripheral-to-expansion bridge 220 bridges the transactions between the peripheral bus 130 and the expansion bus 170. In one embodiment, the peripheral-to-expansion bridge 220 is a PCI-to-ISA bridge.

The arbitration module 230 arbitrates accesses as requested from the data transfer circuit 240 to the peripheral bus 130 via the peripheral bus interface 210. The data transfer circuit 240 includes a set of DMA engines and a set of transmit and receive first-in-first-outs (FIFOs). The transmit FIFOs in the data transfer 240 buffer data from the corresponding DMA engines to send to the serial bus via the physical link interface 155. The receive FIFOs in the data transfer circuit 240 receive and buffer the data sent from the serial bus.

The set of internal registers 260 include registers to store control and status information. The set 260 includes at least an isochronous cycle timer (ICT) register 264 and a link control (LC) register 266. The ICT register 264 stores the value of the timer. This value is either from the cycle timer circuit 270 or from other serial nodes on the bus via the serial link interface 290. The LC register 266 stores control bits as written by the host processor 105 to configure and set up the cycle timer circuit 270.

The cycle timer circuit 270 generates the timing value to be stored in one field of the ICT register 264. The cycle timer circuit 270 also receives update information from the host processor 105 (via the PCI interface 210) and the serial nodes $160_1$–$160_P$ (via the serial link interface 290).

The serial link interface circuit 290 is coupled to the physical link interface 155 to provide interface to the serial bus 165.

OPERATION OF AN EMBODIMENT OF THE INVENTION

Referring again to FIG. 2, the cycle timer circuit 270 maintains a timer value to be stored in the ICT register 264. The timer value is used and updated by various domains or sources. To support these domains, the cycle timer circuit 270 operates in different modes depending on system configuration and operational conditions. In one embodiment, these modes include the following: a master mode, a slave mode, a software update mode, and an external mode.

In the master mode, the cycle timer circuit 270 generates a timing value from a counter clocked by a clock source with a predetermined frequency. In the master mode, the counter operates in a normal counting mode. The update request for this normal counting mode is based on the counter clock signal. In one embodiment, this frequency is 24.576 MHz and the counter counts modulo-3072 to generate a timing interval of 125 usec.

In the slave mode, the cycle timer circuit 270 receives an update request from another timing master device on the serial bus. The update request is transmitted to the cycle timer circuit 270 via the serial link interface 290. The cycle timer circuit 270 receives this update request and its associated update value periodically. This update value is referred to as hardware update (HWUPDATE) value. Since this update value arrives asynchronously to the cycle timer circuit 270, it will be synchronously updated and kept track of. If this HWUPDATE value does not arrive for any reason, the cycle timer circuit 270 still has to update its timing value to avoid loss of timing reference. Therefore, the counter in the cycle timer circuit 270 continues to operate in the normal counting mode after being loaded with the HWUPDATE value. This counter will be replaced by the next HWUPDATE value when the next HWUPDATE value actually arrives.

In the software update mode, the cycle timer circuit 270 receives an update request from the host or other devices capable to issuing update data to the south bridge containing the cycle timer circuit 270. The update request is transmitted to the cycle timer circuit 270 via the peripheral interface 210. The cycle timer circuit 270 may receive this update request and its associated update value at any time. This update value is referred to as software update (SWUPDATE) value. Since this update value arrives asynchronously to the cycle timer circuit 270, it will be synchronously updated and kept track of by the counter in the cycle timer circuit 270. The counter in the cycle timer circuit 270 continues to operate in the normal counting mode after being loaded with the SWUPDATE value.

In the external mode, the cycle timer circuit 270 receives a timing reference signal from an external source. The selection of the mode or the source may be programmed by a bit in a control register. In one embodiment, this bit is preset to select a fixed source. The cycle timer circuit 270 uses this external source to roll over its counter when the counter reaches a predetermined maximum count.

Since several update requests may occur at the same time within the counter timing period, an arbitration scheme is necessary to select the update value. In addition, the update value should be updated synchronously with a local clock to maintain consistency. To maintain consistency and synchronism, a register is clocked independently by the local clock to store the updated timing value. The register clock is independent from the counter clock. The register may be located in the same physical device with the counter to save hardware. The arbitration scheme is based on the priority of the update request. In one embodiment, this priority is fixed as follows: the hardware update has the highest priority, the software update is next, followed by the normal counting update.

The update requests are asserted by the corresponding clock signals. These clock signals are generated by proper clock generator circuits and then gated with the appropriate conditions to produce proper request signals.

Roll-over is a condition when the counter reaches a predetermined count value and then goes back to zero to start a new counting sequence. In the normal counting mode (e.g., the master mode), the counter counts up to a predetermined count value and is loaded with zero in the next count. This predetermined count value is detected by a rollover decoder circuit which essentially decodes the bit pattern forming the count value to match the predetermined value. When this rollover condition is detected, the counter is loaded with zero, either through the register or by a self-clearing operation. If during the rollover condition in a normal counting mode, a new update request arrives, the cycle timer circuit 270 will replace the rollover by the new update value, following the arbitration protocol. Under this scenario, it is possible for the cycle timer circuit 270 to roll over in successive updates when the update value itself is another rollover value.

Figure 3:
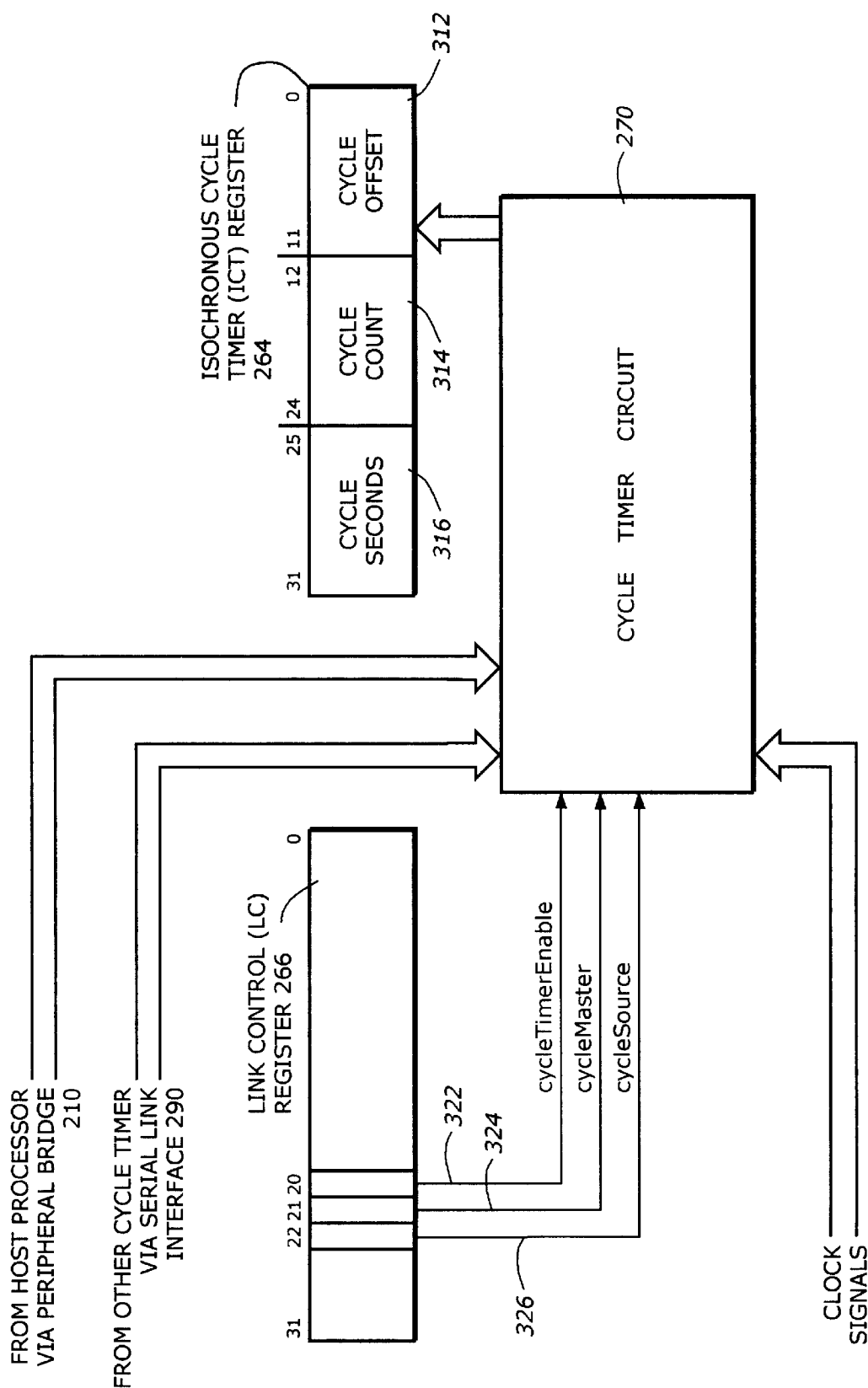
FIG. 3 is a diagram illustrating a configuration of internal registers and the timer circuit according to one embodiment of the invention.

The operation of the cycle timer circuit 270 (FIG. 2) is related to the set of internal registers 260. FIG. 3 is a diagram illustrating a configuration of internal registers and the timer circuit according to one embodiment of the invention.

The ICT register 264 is a read and write register that stores the current cycle number and offset. There are three fields in the ICT register 264: the cycleOffset field 312 (ICT[11:0]), the cycleCount field 314 (ICT[24:12]), and the cycleSeconds field 316 (ICT[31:25]) fields. When the timer circuit 270 is in the cycle master mode, the ICT register 264 is transmitted with the cycle start message. When the timer circuit 270 is in the cycle slave mode, the register is loaded with the data field in an incoming cycle start from another cycle master node. In the event that the cycle start message is not received, the fields continue incrementing on their own (when the counter in the timer circuit 270 is enabled) to maintain a local time reference.

The cycleOffset field 312 represents a counter value that can be updated by a number of timing domains, or clock sources. One clock source is a clock signal operating at a frequency of 24.576 MHz. In this mode, the counter counts modulo 3072. In other words, the counter counts from 0 to 3072 then returns back (or rolls over) to 0 and continues the counting sequence. In this mode, the cycleOffset rolls over every 125 usec. The cycleOffset field 312 may also be updated by software via the host processor 105 or any other devices that have access to the bus. In addition, the cycleOffset field 312 may also be updated by the data field in an incoming cycle start from another cycle master node when the timer circuit 270 operates in the slave mode. Since these timing domains operate independently, the updates may occur in an asynchronous fashion. The cycle timer circuit 270 therefore has to synchronize these updates based on a local timing reference. Furthermore, as discussed earlier, when these updates occur simultaneously, the cycle timer circuit 270 has to arbitrate the update requests so that the highest priority request will be honored.

The cycleCount field 314 counts the cycles as generated by the cycleOffset rollovers modulo 8000. In other words, the cycleCount field 314 rolls over every second. The cycleSeconds field 316 counts seconds modulo 128. In other words, the cycleSeconds field 316 rolls over every 128 seconds.

The Link Control (LC) register 266 provides the control flags that enable and configure the link core protocol portions of the south bridge 150 (FIG. 1). There are 3 bits that are relevant in the present invention: a cycleTimerEnable bit 322 (LC[20]), a cycleMaster bit 324 (LC[21]), and a cycleSource bit 326 (LC[22]).

The cycleTimerEnable (CTE) bit 322 enables the counter in the timer circuit 270. When the CTE bit 322 is set, the counter will count cycles of the counter clock and roll over at the appropriate time based on the settings of the cycleMaster and cycleSource bits 324 and 326. When the CTE bit 322 is cleared, the counter will not count.

The cycleMaster (CM) bit 324 determines if the cycle timer circuit 270 operates in a master or a slave mode. When the CM bit 322 is set, the cycle timer circuit 270 operates in the master mode. In the master mode, the south bridge 150 will generate a cycle start packet every time the counter in the cycle timer circuit rolls over, based on the setting of the cycleSource (CS) bit 326. When the CM bit 322 is cleared, the cycle timer circuit 270 operates in the slave mode. In the slave mode, the cycle timer circuit 270 receives the update from a cycle start packet of another node on the serial bus.

The cycleSource (CS) bit 326 determines the clock source of rollover for the timer circuit 270. When the CS bit 326 is set, the cycle timer circuit 270 uses an external source to determine when to roll over the timer. As discussed before, this external source may also be a fixed clock source. In one embodiment, this fixed clock source is the 24.576 MHz clock. When the CS bit is cleared, the timer circuit 270 will roll the timer over when the timer reaches MAX cycles of the local clock. In one embodiment, the MAX value is 3072 and the frequency of the counter clock is 24.576 MHz, corresponding to an 8 KHz rollover rate.

Figure 4:
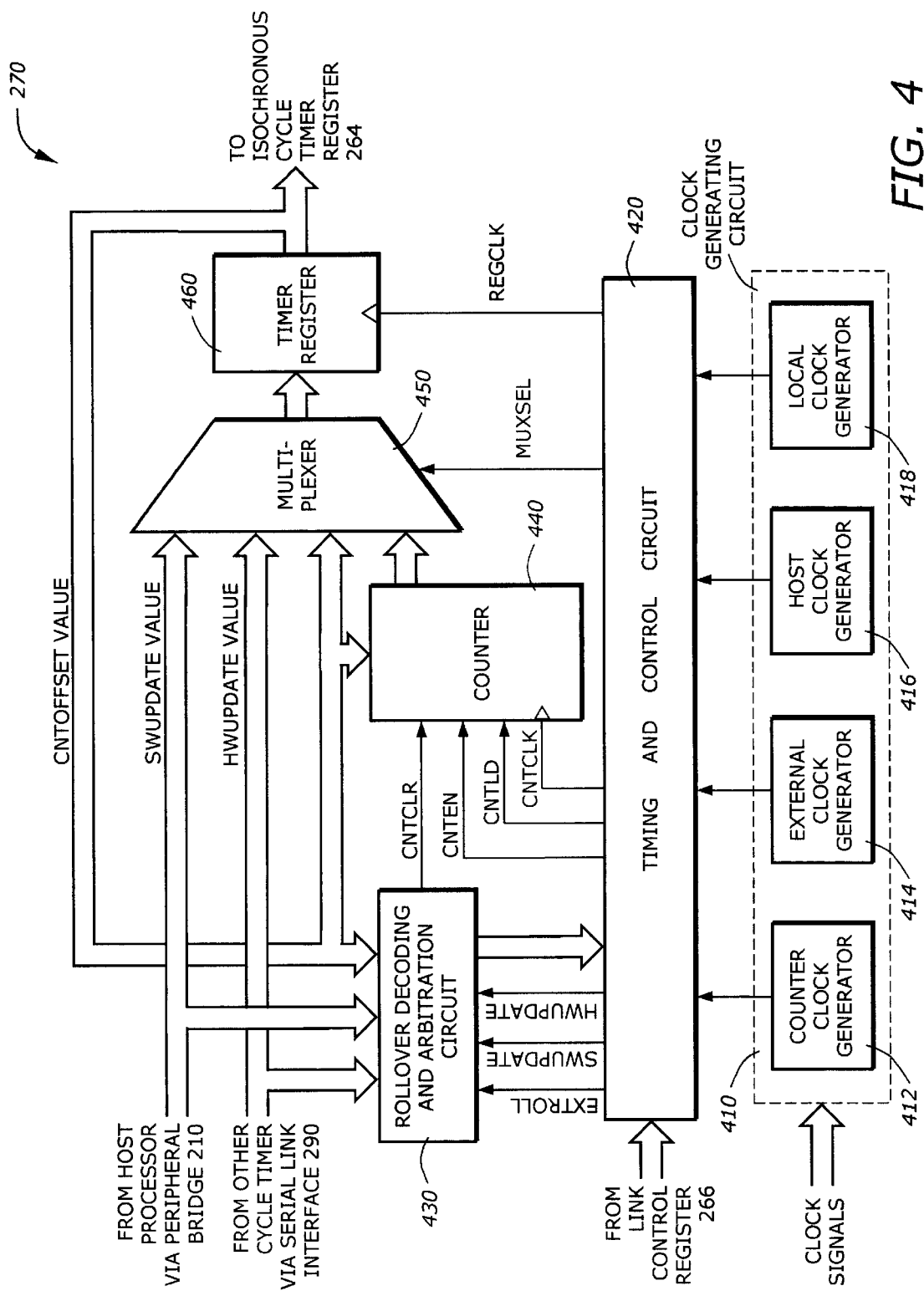
FIG. 4 is a diagram illustrating a timer circuit according to one embodiment of the invention.

FIG. 4 is a diagram illustrating a cycle timer circuit 270 according to one embodiment of the invention. The cycle timer circuit 270 includes a clock generator circuit 410, a timing and control circuit 420, a rollover decoding and arbitration circuit 430, a counter 440, a multiplexer 450, and a timer register 460.

The clock generator circuit 410 receives the clock signals from various sources including the peripheral bus clock, an external clock, a local frequency clock. The clock generator circuit 410 includes a counter clock generator 412, an external clock generator 414, a host clock generator 416, and a local clock generator 418. The counter clock generator 412 generates a clock signal which is used to clock the counter 440. In one embodiment, the counter clock has the frequency of 24.576 MHz. The external clock generator 414 uses the external clock to generate the external clock reference for the external rollover. As discussed before, the external clock source may be a fixed clock source. In one embodiment, the external clock source is the 24.576 MHz clock. The host clock generator 416 uses the peripheral bus clock and address decoding signals to generate a host clock to indicate the arrival of the software update value. The local clock generator 418 generates the clock signal to clock the timer register 460.

The timing and control circuit 420 receives the clock reference signals from the clock generator circuit 410 and the control bits in the link control register 266. These control bits are the cycleTimerEnable 322, the cycleMaster 324, and the cycleSource 326 as shown in FIG. 3. The timing and control circuit 420 generates: (1) the EXTROLL, SWUPDATE, and HWUPDATE signals to the rollover decoding and arbitration circuit 430, (2) the CNTEN, CNTLD, and CNTCLK signals to the counter 440, (3) the MUXSEL signals to the multiplexer 450, and (4) the REGCLK to the timer register 460.

The EXTROLL, SWUPDATE and HWUPDATE signals correspond to the external, software update, and hardware update requests. The EXTROLL signal is asserted when the cycleSource bit 326 is set and the external clock generator 414 generates the external rollover timing reference. The SWUPDATE signal is asserted when there is a write access from the host or other devices to update the timer register as indicated by the host clock generator 416. The HWUPDATE signal is asserted when the cycleMaster bit 324 is cleared and there is an arrival of the start cycle packet from an external node.

The CNTEN signal is used to enable the counter 440 based on the cycleTimerEnable bit 322. The CNTLD signal is used to load the counter 440 with the value presented at the input of the counter 440. The source of the counter input is the feedback of the output of the timer register 460. The CNTCLK signal is the clock signal to clock the counter 440 for normal counting sequence. In one embodiment, the CNTCLK is synchronized with the 24.576 MHz clock signal. The 24.576 MHx clock signal may also be used as the fixed external clock source.

The MUXSEL signals are used to select the inputs of the multiplexer 450. The MUXSEL signals are synchronized with appropriate clock signal based on the arbitration logic.

The REGCLK signal is used to clock the timer register 460. The REGCLK synchronizes all the update values with the local clock signal as generated by the local clock generator 418.

The rollover decoding and arbitration (RDA) circuit 430 decodes the rollover conditions and arbitrates all the update requests. When a rollover condition occurs, the RDA circuit 430 generates a CNTCLR signal to clear the counter 440 to zero. Alternatively, the RDA circuit 430 may generate a zero value to be loaded to the timer register 460 through the multiplexer 450. When there are multiple update requests such as those asserted by the SWUPDATE and the HWUPDATE signals, the RDA circuit 430 arbitrates the requests and provide proper control signals to the timing and control circuit 420.

The counter 440 is an N-bit binary counter to generate a counting sequence clocked by the CNTCLK signal. In one embodiment, the counter 440 is a 12-bit binary counter with enable, load, and clear control signals. As is known by one skilled in the art, other types of counters can also be used. The counter 440 generates the counter value to be loaded into the timer register 460. The timer register 460 may be integrated with the counter 440 to be in the same device. The counter 440 is used in the cycle master mode, or when the update values (e.g., HWUPDATE) value is not received. The counter 440 is disabled when the CNTEN signal is deasserted.

The multiplexer 450 generates the output from the following inputs: the software update (SWUPDATE) value from the host processor via the peripheral bus, the hardware update (HWUPDATE) value from other cycle timer via the serial link interface 290, the feedback value (CNTOFFSET) from the output of the timer register 460, and the output of the counter 440. The multiplexer 450 is controlled by the MUXSEL signals. In one embodiment, the multiplexer 450 is a 12-bit four-to-one multiplexer.

The MUXSEL signals are encoded based on the arbitration scheme and the update requests. The sampling of the MUXSEL signals is synchronized with the local clock to maintain consistency and to satisfy set-up and hold time requirements.

The timer register 460 receives the output of the multiplexer 450 and clocks that value into the register at the REGCLK signal. The output of the timer register 460 is then fedback to the circuit and represents the countOffset field in the isochronous cycle timer register 264 (FIG. 3). The timer register 460 may be an integral part of the counter 440 and the timer register 460 and the counter 440 may be implemented in the same physical device to save hardware.

Figure 5:
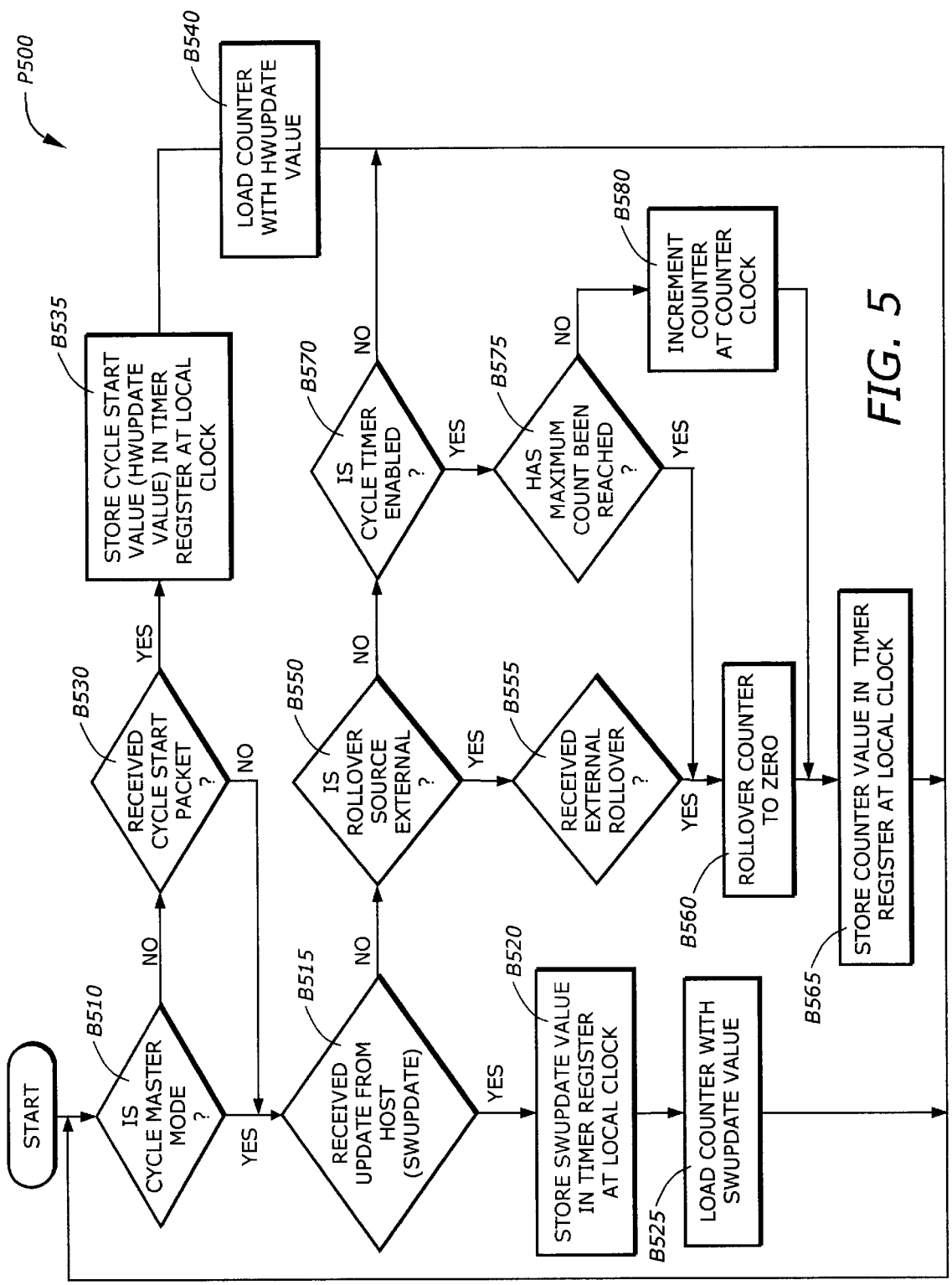
FIG. 5 is a flow diagram illustrating a process for updating the timer according to one embodiment of the invention.

FIG. 5 is a flow diagram illustrating a process P500 for updating the timer according to one embodiment of the invention.

Upon START, the process P500 determines if the timer circuit is in the cycle master mode (B510). This can be done by decoding or examining the cycleMaster bit 324. If the timer circuit is in the cycle master mode, the process P500 determines if the timer circuit receives an update from the host (SWUPDATE) (B515). If the timer circuit received a SWUPDATE, the process P500 stores this SWUPDATE value in the timer register clocked by the local clock (B520). Then the process P500 loads the counter with the SWUPDATE value so that the counter can start counting from the loaded value (B525). The order between the two blocks B520 and B525 may be reversed. When the timer register is implemented in the same device with the counter, the loading of the timer register is essentially the same as the loading of the counter. If the timer circuit does not receive the SWUPDATE value, the process P500 determines if the rollover source is external or local (B550). If the rollover source is external, the process P500 determines if the timer circuit has received the external rollover signal (B555). If the source is not external, the process P500 enters block B570 as will be explained later.

If the timer circuit has received the external rollover signal, the process P500 rollovers the counter to zero (B560), and then stores the counter value in the timer register clocked by the local clock (B565). If the timer circuit has not received the external rollover signal, the process P500 determines if the cycle timer is enabled (B570). If the cycle timer is not enabled, the process P500 returns back to block 510. If the cycle timer is enabled, the process P500 determines if the maximum count has been reached (B575). In one embodiment, this maximum count is 3072 which corresponds to 125 usec at 24.576 MHz for the isochronous delivery time interval. If the maximum count has been reached, the process P500 rollovers the counter to a zero value (B560). If the maximum count has not been reached, the process P500 increments the counter at the counter clock. Then the process P500 stores the counter value in the timer register at the local clock.

If the timer circuit is not in cycle master mode, the process P500 determines if the timer circuit has received a cycle start packet from other nodes on the serial bus (B530). If not, the process P500 enters block B515. If the timer circuit has received the cycle start packet, the process P500 stores the cycle start (HWUPDATE) value in the timer register at the local clock (B535). Then the process P500 loads the counter with the HWUPDATE value (B540). The order between the two blocks B535 and B540 may be reversed. When the timer register is implemented in the same device with the counter, the loading of the timer register is essentially the same as the loading of the counter. The process P500 then returns back to the START to continue the process.

The present invention therefore provides a technique update a timer from multiple timing domains. The technique is simple, efficient, and flexible, without using too much hardware.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for updating a timer from a plurality of timing domains, the method comprising:

arbitrating update requests from the plurality of timing domains, the plurality of timing domains including at least a counter, the update requests providing update values;

selecting a timer value from the update values; and storing the timer value in a timer register synchronously with a local clock signal.

2. The method of claim 1 wherein arbitrating the update requests is based on a predetermined priority.

3. The method of claim 1 wherein the update requests include a normal incrementing request, a rollover request, a software update request, and a hardware update request.

4. The method of claim 3 wherein the normal incrementing request corresponds to a counting operation by the counter.

5. The method of claim 3 wherein the software update request corresponds to an update value written by a processor having access to the timer.

6. The method of claim 3 wherein the hardware update request corresponds to an update value transmitted by a master timer.

7. The method of claim 3 wherein the rollover request occurs based on one of an internal condition and an external condition.

8. The method of claim 7 wherein the internal condition corresponds to when the counting operation reaches a predetermined count.

9. The method of claim 7 wherein the external condition corresponds to an assertion of an external rollover clock signal.

10. An apparatus for updating a timer from a plurality of timing domains, the apparatus comprising:

an arbitration circuit to arbitrate update requests from the plurality of timing domains, the plurality of timing domains including at least a counter, the update requests providing update values;

a multiplexer coupled to receive the update values, the multiplexer selecting a timer value from the update values; and a timer register coupled to the multiplexer to store the timer value synchronously with a local clock signal.

11. The apparatus of claim 10 further comprises:

a timing and control circuit, coupled to the counter, the arbitration circuit and the timer register to synchronize the update values based on the local clock signal.

12. The apparatus of claim 10 wherein the arbitration circuit arbitrates the update requests based on a predetermined priority.

13. The apparatus of claim 10 wherein the update requests include a normal incrementing request, a rollover request, a software update request, and a hardware update request.

14. The apparatus of claim 13 wherein the software update request corresponds to an update value written by a processor having access to the timer.

15. The apparatus of claim 13 wherein the hardware update request corresponds to an update value transmitted by a master timer.

16. The apparatus of claim 13 wherein the counter carries out a counting operation based on a counter clock signal in response to the normal incrementing request.

17. The apparatus of claim 16 wherein the rollover request occurs based on one of an internal condition and an external condition.

18. The apparatus of claim 17 wherein the internal condition corresponds to when the counting operation reaches a predetermined count.

19. The apparatus of claim 17 wherein the external condition corresponds to an assertion of an external rollover clock signal.

20. A system comprising:

a first bus;

a processor coupled to the first bus;

a memory coupled to the processor; and a bridge coupled to the first bus and a second bus via a physical link device, the bridge updating a timer from a plurality of timing domains, the bridge comprising:

an arbitration circuit to arbitrate update requests from the plurality of timing domains, the plurality of timing domains including at least a counter, the update requests providing update values, a multiplexer coupled to receive the update values, the multiplexer selecting a timer value from the update values, and a timer register coupled to the multiplexer to store the timer value synchronously with a local clock signal.

21. The system of claim 20 wherein the arbitration circuit arbitrates the update requests based on a predetermined priority.

22. The system of claim 20 wherein the update requests include a normal incrementing request, a rollover request, a software update request, and a hardware update request.

23. The system of claim 22 wherein the bridge further comprises:

a timing and control circuit, coupled to the arbitration circuit and the timer register to synchronize the update values based on the local clock signal.

24. The system of claim 22 wherein the software update request corresponds to an update value written by the processor having access to the timer.

25. The system of claim 22 wherein the hardware update request corresponds to an update value transmitted by a master timer connected to the second bus via the physical link device.

26. The system of claim 22 wherein the counter carries out a counting operation based on a counter clock signal in response to the normal incrementing request.

27. The system of claim 26 wherein the rollover request occurs based on one of an internal condition and external condition.

28. The system of claim 27 wherein the internal condition corresponds to when the counting operation reaches a predetermined count.

29. The system of claim 27 wherein the external condition corresponds to an assertion of an external rollover clock signal.

* * * * *